(12) United States Patent
Weksler et al.

(10) Patent No.: US 10,185,529 B2
(45) Date of Patent: Jan. 22, 2019

(54) INDICATING A CONNECTION TO A PRINTER

(71) Applicant: LENOVO (Singapore) PTE. LTD., New Tech Park (SG)

(72) Inventors: Arnold S. Weksler, Raleigh, NC (US); Antonio Bumarch, III, Cary, NC (US); Neal Robert Caliendo, Jr., Raleigh, NC (US); Justin Tyler Dubs, Raleigh, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 0 days.

(21) Appl. No.: 14/961,103

(22) Filed: Dec. 7, 2015

(65) Prior Publication Data

US 2017/0161002 A1    Jun. 8, 2017

(51) Int. Cl.
   *G06F 3/12* (2006.01)

(52) U.S. Cl.
   CPC .......... *G06F 3/1294* (2013.01); *G06F 3/1204* (2013.01); *G06F 3/1231* (2013.01); *G06F 3/1236* (2013.01); *G06F 3/1285* (2013.01); *G06F 3/1292* (2013.01)

(58) Field of Classification Search
   None
   See application file for complete search history.

(56) References Cited

U.S. PATENT DOCUMENTS

| | | | | |
|---|---|---|---|---|
| 2012/0005395 | A1* | 1/2012 | Lydon | G06F 13/387 710/315 |
| 2013/0141756 | A1* | 6/2013 | Miller | G06F 3/1204 358/1.15 |
| 2014/0192996 | A1* | 7/2014 | Wilcox | H04M 1/05 381/77 |
| 2015/0244878 | A1* | 8/2015 | MacAuley | G06F 3/1204 358/1.2 |
| 2016/0284170 | A1* | 9/2016 | Kasmir | H04L 12/2818 |

* cited by examiner

*Primary Examiner* — John R Wallace
(74) *Attorney, Agent, or Firm* — Kunzler, PC

(57) ABSTRACT

Apparatuses, systems, methods, and program products are disclosed for indicating a connection to a printer. A signal reception module receives a signal at a printer of a plurality of printers from an information handling device. The signal requests an indication that the information handling device is connected to the printer. An indication type module determines a type of indication to provide based on the received signal. An indicator provider module provides an indication of the determined type from the printer that indicates the information handling device is connected to the printer.

13 Claims, 6 Drawing Sheets

INDICATING A CONNECTION TO A PRINTER

FIELD

The subject matter disclosed herein relates to printers and more particularly relates to identifying a printer that a device is connected to.

BACKGROUND

Description of the Related Art

Some computing environments, such as work offices, universities, government agencies, or the like, may have multiple printers that a user can connect to using various electronic devices. At any particular location, the printers may be located at various areas, rooms, floors, or the like. Thus, it may be difficult for a user to determine which of the multiple printers the user has selected to print to. A user may think he is printing to one device, but he may actually be printing to a different device located elsewhere.

BRIEF SUMMARY

An apparatus for indicating a connection to a printer is disclosed. A method and computer program product also perform the functions of the apparatus. In one embodiment, an apparatus includes a processor and memory that stores code executable by the processor. In certain embodiments, the executable code includes code to receive a signal at a printer from an information handling device. The signal may request an indication related to the connection of the information handling device to the printer. In a further embodiment, the executable code includes code to determine a type of indication to provide based on the received signal. In some embodiments, the executable code includes code to provide an indication of the determined type from the printer that indicates the connection of the information handling device to the printer.

In one embodiment, the type of indicator comprises an audible sound generated by the printer to indicate that the information handling device is connected to the printer. In a further embodiment, the type of indicator comprises a blinking light generated by the printer to indicate that the information handling device is connected to the printer. In some embodiments, the type of indicator comprises a message presented on a display of the printer to indicate that the information handling device is connected to the printer. In one embodiment, the message presented on the display of the printer comprises an identifier for the information handling device that is connected to the printer.

In certain embodiments, the executable code includes code to receive a confirmation at the printer that the information handling device is connected to the printer. In one embodiment, the printer is one of a plurality of printers accessible by the information handling device. In a further embodiment, the information handling device is communicatively coupled to one or more of the plurality of printers through a wireless network connection. In some embodiments, the wireless network connection comprises one or more of a Wi-Fi connection, a Bluetooth® connection, an NFC connection, and a connection through a wireless beacon.

A method, in one embodiment, includes receiving, by use of a processor, a signal at a printer from an information handling device. The signal may request an indication related to the connection of the information handling device to the printer. In a further embodiment, the method includes determining a type of indication to provide based on the received signal. In some embodiments, the method includes providing an indication of the determined type from the printer that indicates the connection of the information handling device to the printer.

In one embodiment, the type of indicator comprises an audible sound generated by the printer to indicate that the information handling device is connected to the printer. In a further embodiment, the type of indicator comprises a blinking light generated by the printer to indicate that the information handling device is connected to the printer.

In some embodiments, the type of indicator comprises a message presented on a display of the printer to indicate that the information handling device is connected to the printer. In certain embodiments, the message presented on the display of the printer comprises an identifier for the information handling device that is connected to the printer. In one embodiment, the method further includes receiving a confirmation at the printer that the information handling device is connected to the printer. In some embodiments, the printer is one of a plurality of printers accessible by the information handling device.

In one embodiment, a program product includes a computer readable storage medium that stores code executable by a processor. In one embodiment, the executable code includes code to perform receiving a signal at a printer from an information handling device. The signal may request an indication related to the connection of the information handling device to the printer. In some embodiments, the executable code includes code to perform determining a type of indication to provide based on the received signal. In various embodiments, the executable code includes code to perform providing an indication of the determined type from the printer that indicates the connection of the information handling device to the printer.

In one embodiment, the type of indicator comprises an audible sound generated by the printer to indicate that the information handling device is connected to the printer. In some embodiments, the type of indicator comprises a blinking light generated by the printer to indicate that the information handling device is connected to the printer. In a further embodiment, the type of indicator comprises a message presented on a display of the printer to indicate that the information handling device is connected to the printer.

A method, in certain embodiments, includes determining, by a processor, an information handling device is within a communication proximity of a printer. In a further embodiment, a method includes sending a message from the printer to the information handling device. The message may include a request for the information handling device to connect to the printer. In certain embodiments, the method includes connecting the information handling device to the printer in response to receiving a confirmation message from the information handling device.

In one embodiment, the method includes receiving a signal at the printer indicating that the information handling device is within a communication proximity of the printer. In a further embodiment, the signal is received from a beacon in wireless communication with the information handling device and the printer.

In various embodiments, the message sent to the information handling device from the printer comprises configuration information that allows the information handling device to connect to the printer. In one embodiment, the message is sent via an email, a text message, an instant message, a mobile application, and a browser plugin.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
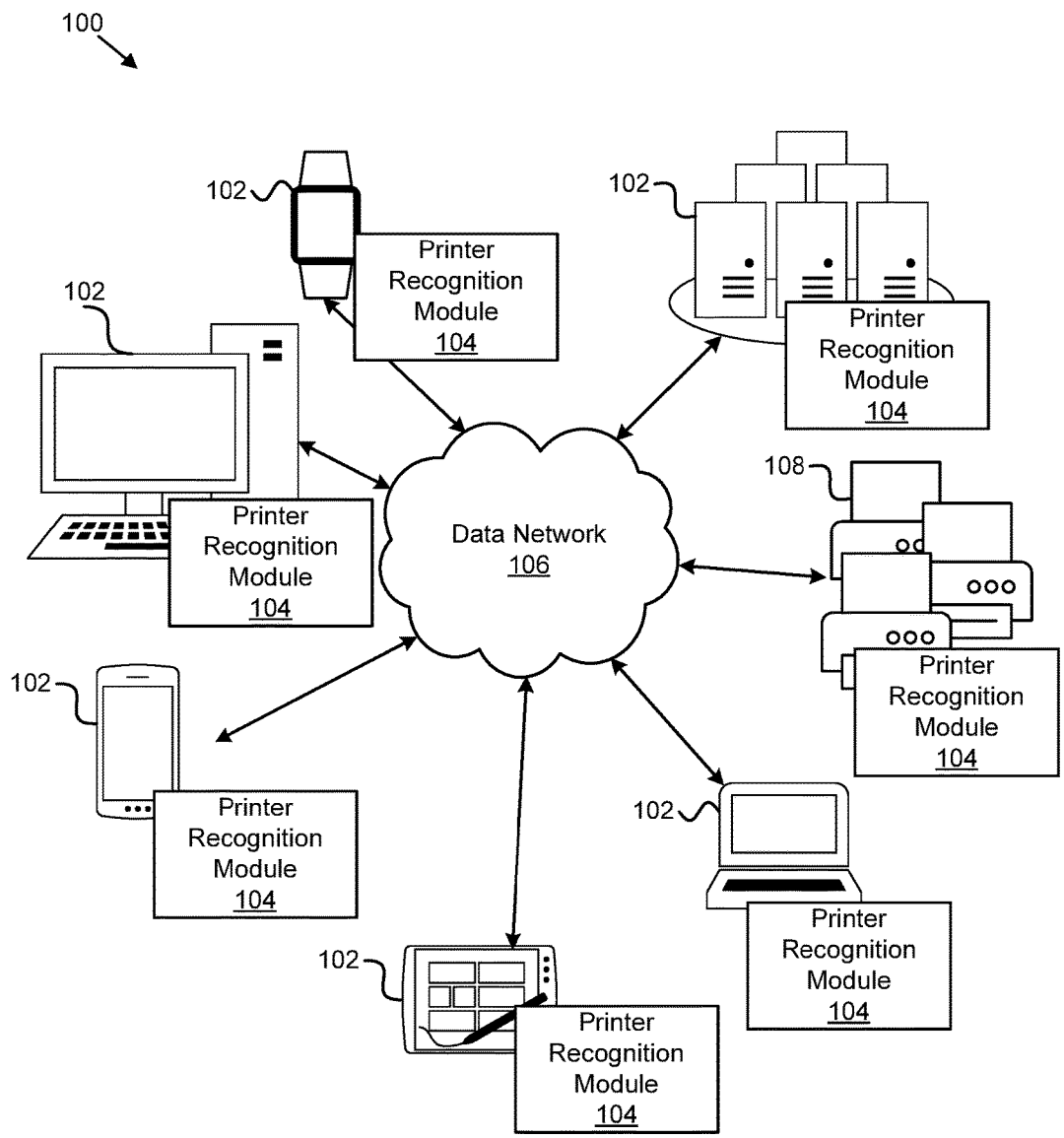
FIG. 1 is a schematic block diagram illustrating one embodiment of a system for indicating a connection to a printer.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a system 100 for indicating connection to a printer 108. In one embodiment, the system 100 includes information handling devices 102, printer recognition modules 104, data networks 106, and printing devices 108. In certain embodiments, even though a specific number information handling devices 102, printer recognition modules 104, data networks 106, and printing devices 108 are depicted in FIG. 1, one of skill in the art will recognize that any number of information handling devices 102, printer recognition modules 104, data networks 106, and printing devices 108 may be included in the system 100 for indicating connection to a printer 108.

In one embodiment, the information handling devices 102 include desktop computers, laptop computers, personal digital assistants (PDAs), tablet computers, smart phones, smart televisions (e.g., televisions connected to the Internet), set-top boxes, game consoles, or the like. In some embodiments, the information handling devices 102 include wearable devices, such as smart watches, fitness bands, optical head-mounted displays, or the like.

In certain embodiments, the information handling devices 102 include servers, blade servers, virtual servers, cloud servers, servers of a data center, network servers, remote servers, or the like. The servers may be configured as application servers, email servers, database servers, file servers, game servers, home servers, media servers, web servers, and/or the like. In certain embodiments, the servers are communicatively coupled to other information handling devices 102 via the data network 106 such that the information handling devices 102 may store and/or access data on the servers. For example, servers may store applications, files, programs, metadata, databases, registries, log files, or the like.

The information handling devices 102 may include various storage devices for storing files, such as text files, images, videos, source code, PDF files, music files, or the like. The storage devices may include memory such as flash storage media, hard disk drives, removable storage media, tape drives, solid-state storage media, read-only memory ("ROM"), random access memory ("RAM"), or the like. The information handling devices 102 may be installed with an operating system, such as Microsoft Windows®, Windows Server®, Apple OS X®, various Linux® distributions, Android®, iOS®, Windows Mobile®, or the like. Furthermore, the information handling devices 102 may include a file system that organizes, arranges, or otherwise manages storage and access of various files stored on the information handling devices 102.

The information handling devices 102, in certain embodiments, include one or more installed applications that are configured to send content to one or more printers 108 for printing, such as images, text documents, PDF documents, or the like. For example, a smart phone 102 may include a word processing application, a web browser, a PDF viewer, an image viewer, a social media application, or the like. One of skill in the art will realize the various applications that may be used to print content to a printer 108.

In one embodiment, the printer recognition module 104 is configured to receive a signal at a printer 108 from an information handling device 102. In certain embodiments, the signal requests an indication related to the connection of the information handling device 102 to the printer 108. In a further embodiment, the printer recognition module 104 determines a type of indication to provide based on the received signal. In one embodiment, the printer recognition module 104 provides an indication of the determined type from the printer 108 that indicates the connection of the information handling device 102 to the printer 108. The printer recognition module 104, in one embodiment, includes various modules that perform the functions of the printer recognition module 104, as described below with reference to FIGS. 2 and 3.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

A printer 108, as is known in the art, includes a peripheral that makes a persistent human readable representation of graphics or text on paper or similar physical media. A printer 108, in one embodiment, includes a network printer 108 such that the printer is accessible by various information handling devices 102 through a data network 106. For example, a laptop computer may be connected to a printer 108 using a wired connection, e.g., an Ethernet connection, a USB connection, or the like, or a wireless network connection, e.g., a Wi-Fi connection, a Bluetooth® connection, an ad-hoc connection, an IR connection, an NFC connection, a connection through a wireless beacon, or the like. A printer 108 may include a laser printer, an inkjet printer, a dot matrix printer, a multifunction printer (e.g., a printer that is part of a device that also includes a photocopier, a fax machine, or the like), or the like.

In certain embodiments, a printer 108 is one of a plurality of printers 108 connected to a network. For example, an office may have a plurality of printers 108 located in various locations in the office (e.g., on the same floor, on different floors, in the same room, in different rooms, or the like). A printer 108 may include a name or other identifier that may be used to find and/or connect to the printer 108. In certain embodiments, the name or identifier of a printer 108 is not unique to the printer 108. An information handling device 102, in various embodiments, may install configuration data, files, scripts, programs, or the like, for a printer 108 in order to connect to and/or communicate with the printer 108.

Figure 2:
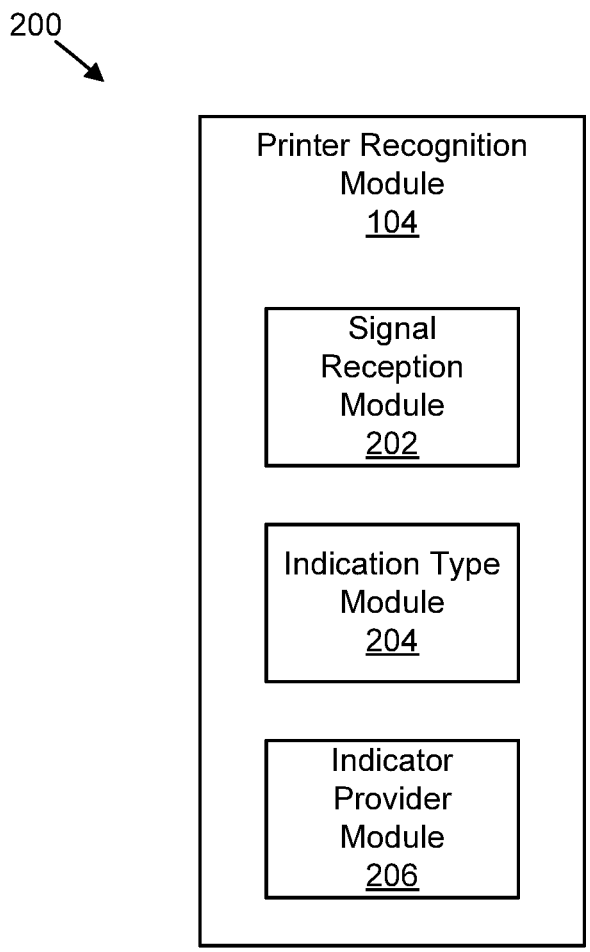
FIG. 2 is a schematic block diagram illustrating one embodiment of a module for indicating a connection to a printer.

FIG. 2 depicts one embodiment of a module 200 for indicating a connection to a printer 108. In one embodiment, the module 200 includes an embodiment of a printer recognition module 104. The printer recognition module 104, in various embodiments, includes one or more of a signal reception module 202, an indication type module 204, and an indicator provider module 206, which are described in more detail below.

In one embodiment, the signal reception module 202 is configured to receive a signal at a printer 108 from an information handling device 102 connected to the printer 108. The signal may request an indication related to the connection of the information handling device 102 to the printer 108. For example, a user may have a difficult time determining which printer 108 of several printers 108 is connected to his laptop computer, especially where each printer 108 does not have a unique identifier, or the printers' 108 identifiers are unknown. The user may send a signal or message to the printer 108 from his laptop, which the signal reception module 202 may receive, to request the printer 108 to identify itself as the printer 108 that the user's laptop is connected to, has selected to print to, or the like. The signal may comprise a message, a data packet, or the like that includes data regarding the associated with requesting an indication that the printer 108 is connected to the information handling device 102.

In certain embodiments, the signal reception module 202 receives a signal wirelessly from the information handling device 102. For example, the signal reception module 202 may receive the signal wirelessly via a Bluetooth® connection, an NFC connection, an ad-hoc connection, an IR connection, a Wi-Fi connection, or the like. The signal reception module 202 may receive a wireless signal directly from an information handling device 102, from a wireless beacon connected to the information handling device 102 and the printer 108, from a data network 106, and/or the like.

In various embodiments, the signal reception module 202 receives a signal from a wired connection to the information handling device 102. The wired connection, in some embodiments, includes an Ethernet connection, a USB connection, a FireWire connection, a Thunderbolt connection, or the like. For example, the signal reception module 202 may receive a signal from a desktop computer via an Ethernet connection to the desktop computer.

In one embodiment, the indication type module 204 determines a type of indication to provide from the printer 108 based on the received signal. In certain embodiments, the signal that the signal reception module 202 receives includes data or information specifying a type of indicator that the printer 108 should provide to indicate that it is the printer 108 that the information handling device 102 has selected. In certain embodiments, a user may trigger transmission of a signal from an information handling device 102 to a printer 108 via a program, an application, a web browser, a printer configuration interface, a physical button on the information handling device 102, or the like. In addition, a user may specify an indicator type for the printer 108 to provide to indicate which printer 108 the information handling device 102 is connected to.

In one embodiment, the indicator type includes generating an audible sound from the printer 108 to indicate that the information handling device 102 is connected to the printer 108. For example, a user may specify that the printer 108 connected to the user's laptop computer provide a beep, alarm, or the like sound to indicate which printer 108 the user's laptop computer is connected to.

In one embodiment, the indicator type includes a turning on a light on the printer 108 to indicate that the information handling device 102 is connected to the printer 108. For example, a user may specify that the printer 108 connected to the user's laptop computer turn on a light, such as an LED, an LCD display, or the like. In certain embodiments, the indicator type indicates whether the printer 108 should generate a blinking light, a blinking speed for the blinking light, a color for the light indicator, or the like.

In one embodiment, the indicator type includes displaying a message on a display of the printer 108 to indicate that the information handling device 102 is connected to the printer 108. In certain embodiments, the message presented on the display of the printer 108 includes an identifier for the information handling device 102 connected to the printer 108. For example, a user may specify that the printer 108 connected to the user's laptop computer display a message that includes the laptop computer's identifier (e.g., the name, IP address, MAC address, or the like of the laptop computer) to verify that the laptop computer is the device that is connected to the printer 108.

In one embodiment, the indicator provider module 206 provides the indication of the type that the indication type module 204 determined from the received signal to indicate the connection of the information handling device 102 to the printer 108. As described above, the indicator provider module 206 may trigger generating a sound from the printer 108, turning on a light on the printer 108, presented on a message on a display of the printer 108, or the like, according to an indication type that the indication type module 204 determined.

In one embodiment, the indicator provider module 206 provides the indicator for a predefined period of time. For example, the indicator provider module 206 may generate a blinking light for five seconds, ten seconds, or the like. In a further embodiment, the indicator provider module 206 provides the indicator until the user turns off the indicator. The user, for example, may turn off the indicator via their information handling device 102 or may turn off the indicator by manually pressing a button on the printer 108 or interacting with a printer menu at the printer 108.

In one embodiment, the indicator provider module 206 may provide a combination of the foregoing indicators from the printer 108. For example, the indicator provider module 206 may provide a blinking light and a message on the display of the printer 108, an audible sound and a blinking light, an audible sound and a message on the display of the printer 108, or an audible sound, a blinking light, and a message on the display of the printer 108. The combination of indicators may be specified by the user and determined by the indication type module 204 from the signal that the signal reception module 202 receives from the user's information handling device 102.

Figure 3:
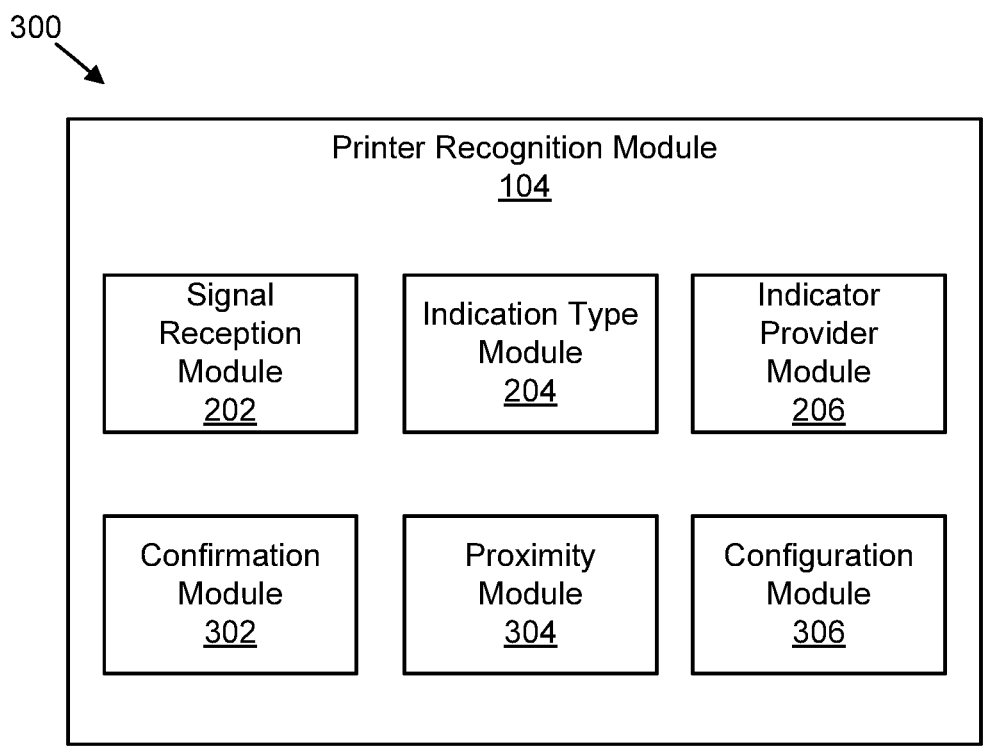
FIG. 3 is a schematic block diagram illustrating one embodiment of another module for indicating a connection to a printer.

FIG. 3 depicts one embodiment of a module 300 for indicating a connection to a printer 108. In one embodiment, the module 300 includes an embodiment of a printer recognition module 104. The printer recognition module 104, in various embodiments, includes one or more of a signal reception module 202, an indication type module 204, and an indicator provider module 206, which may be substantially similar to the signal reception module 202, the indication type module 204, and the indicator provider module 206 described above with reference to FIG. 2. In a further embodiment, the printer recognition module 104 includes a confirmation module 302, a proximity module 304, and a configuration module 306, which are described in more detail below.

The confirmation module 302, in one embodiment, receives a confirmation at a printer 108 that an information handling device 102 is connected to the printer 108. In one embodiment, the user may press a button on the printer 108, may interact with a display on the printer 108, or the like to confirm that the information handling device 102 is connected to the printer 108. In a further embodiment, the user may confirm connection to the printer 108 using an application, a program, a printer configuration menu item in a displayed interface, a physical button on the user's information handling device 102, or the like. As described above, in response to the confirmation module 302 receiving a confirmation from the user that the user's information handling device is connected to the printer 108, the indicator provider module 206 may cease providing one or more indicators from the printer 108.

In one embodiment, the proximity module 304 determines whether an information handling device 102 is within a communication proximity of a printer 108. For example, a smart phone and/or a printer 108 may include one or more sensors, such as proximity sensors, that sense when the smart phone is within a proximity of a printer 108 such that the smart phone and the printer 108 may electronically and wirelessly communicate with one another.

In such an embodiment, the proximity module 304, in response to determining that the printer 108 and information handling device 102 are within a communication proximity of each other, may send a signal or message from the printer 108 to the information handling device 102 without the signal reception module 202 receiving a signal from the information handling device 102. In certain embodiments, the signal is transmitted through a wireless beacon in communication with both the printer 108 and the information handling device 102. In such an embodiment, the proximity module 304 may be located on the wireless beacon to sense proximity information and facilitate communication between the printer 108 and the information handling device 102.

The signal or message that the proximity module 304 sends may include an invitation, request, or the like for the information handling device 102 to connect to the printer 108. In some embodiments, the information handling device 102 is not connected to the printer 108, or has not previously been connected to the printer 108. The signal or message may be sent via a text message, an email message, a push notification, a mobile application, a browser plugin, or the like. In certain embodiments, the information handling device 102 is connected to the printer 108 in response to receiving a confirmation message from the information handling device 102 to connect to the printer 108.

In certain embodiments, because the information handling device 102 is not connected to the printer 108, or has not previously been connected to the printer 108, the information handling device 102 may not be configured to print to the printer 108. In such an embodiment, the configuration module 306 configures the information handling device 102 to connect and print to the printer 108 in response to determining that the information handling device 102 is not configured to connect and print to the printer 108.

In one embodiment, the signal or message that the proximity module 304 sends to the information handling device 102 includes configuration information such that the information handling device 102 can print to the printer 108. The configuration information may be specific to the printer 108 and may include firmware, drivers, configuration files, scripts, or the like to allow the information handling device 102 to connect and print to the printer 108. In certain embodiments, the configuration module 306 receives the configuration information from the proximity module 304 and configures the information handling device 102 in response to receiving a confirmation from the user to accept the printer's 108 invitation to connect to it.

Figure 4:
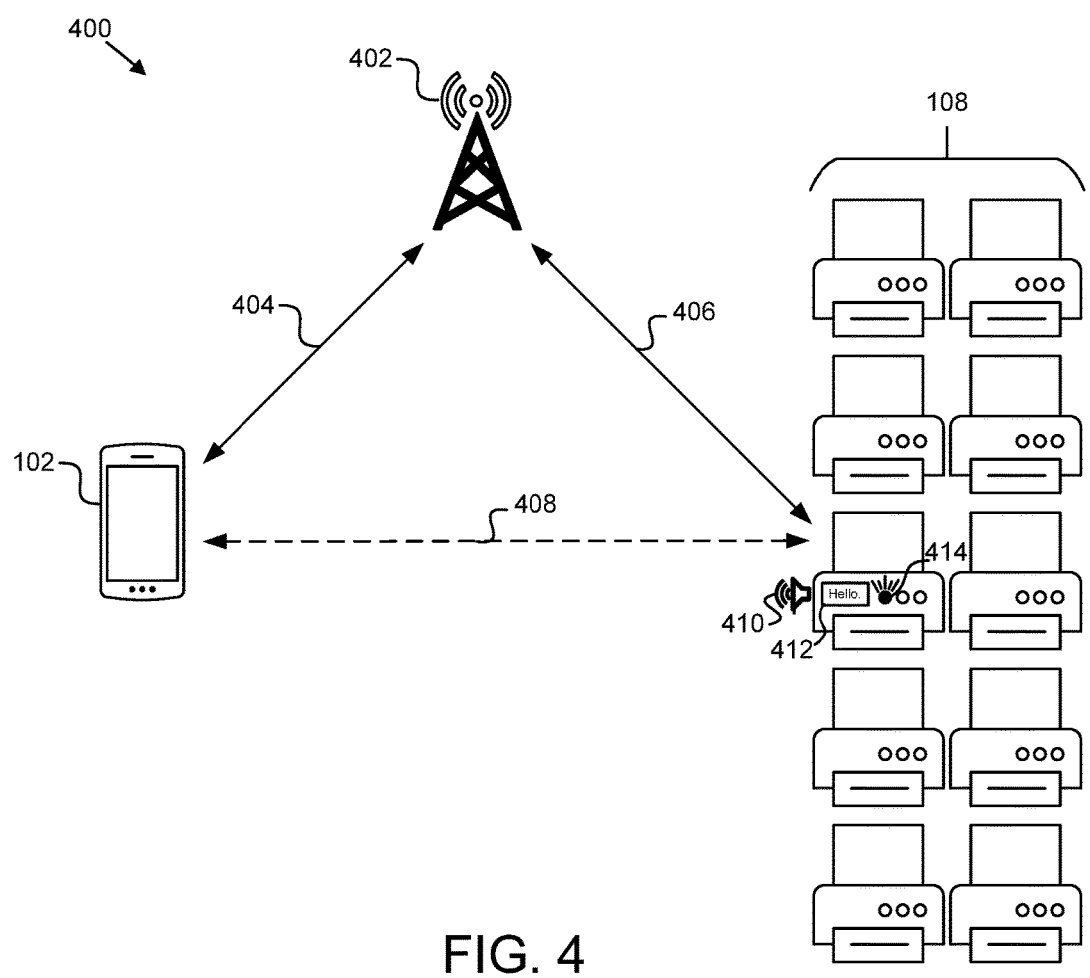
FIG. 4 is a schematic flow chart diagram illustrating one embodiment of a system for indicating a connection to a printer.

FIG. 4 depicts one embodiment of a system 400 for indicating a connection to a printer 108. In the depicted embodiment, a user may want to print a document to a printer 108 of a plurality of printers 108, such as a bank of printers 108 that are located at an office, school, or the like and are placed in various locations, but may not be sure which of the printers 108 the user has selected on the information handling device 102. Accordingly, the user may trigger transmission of a message or signal to the printer 108 that the information handling device 102 is currently connected to.

The message or signal may be transmitted 408 directly to the printer 108, in one embodiment. In some embodiments, the message or signal may be transmitted 404 via a wireless beacon 402, data network 106, or the like and then transmitted 406 to the printer 108. The signal or message may be received by the signal reception module 202. The indication type module 204 may determine a type of indicator to provide according to the received signal. The indicator provider module 206 may provide, in one embodiment, an audible sound 410, a message 412 presented on a display of the printer 108, a blinking light 414, and/or any combination of the foregoing indicators.

In certain embodiments, the proximity module 304 located at the wireless beacon 402 and/or at the printer 108 may detect the proximity of the information handling device 102 when it is in a communication proximity of the proximity module 304. In such an embodiment, the proximity module 304 may send a message to the information handling device 102 from the printer 108 (via the wireless beacon, in some embodiments) inviting the information handling device 102 to connect to and use the printer 108. If the user accepts the invitation, the proximity module 304 and/or the configuration module 306 sends printer configuration information to the information handling device 102, which the configuration module 306 uses to configure the information handling device 102 to connect to and print on the printer 108.

Figure 5:
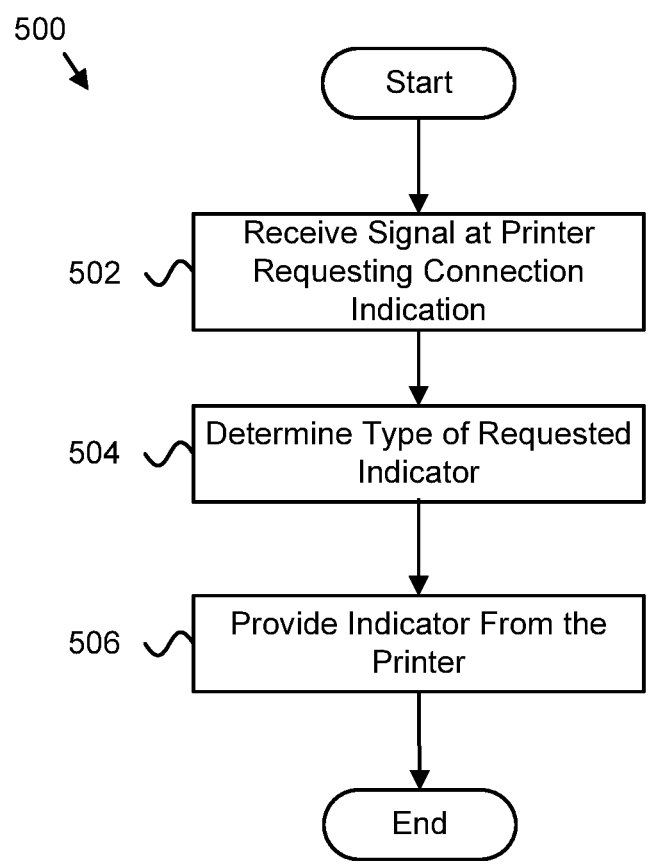
FIG. 5 is a schematic flow chart diagram illustrating one embodiment of a method for indicating a connection to a printer.

FIG. 5 is a schematic flow chart diagram illustrating one embodiment of a method 500 for indicating a connection to a printer 108. In one embodiment, the method 500 begins and receives 502 a signal at a printer 108 from an information handling device 102. The signal may request an indication related to the connection of the information handling device 102 to the printer 108. In one embodiment, a signal reception module 202 receives the signal. In a further embodiment, the method 500 determines 504 a type of indication to provide based on the received signal. The type of indicator may include an audible sound, a blinking light, a message presented on a display of the printer 108, and/or any combination of the foregoing. In certain embodiments, the indication type module 204 determines the indicator type. In a further embodiment, the method 500 provides an indication of the determined type from the printer 108 that indicates the connection of the information handling device 102 to the printer 108. In one embodiment, the indicator provider module 206 provides 506 the indication from the printer 108, and the method 500 ends.

Figure 6:
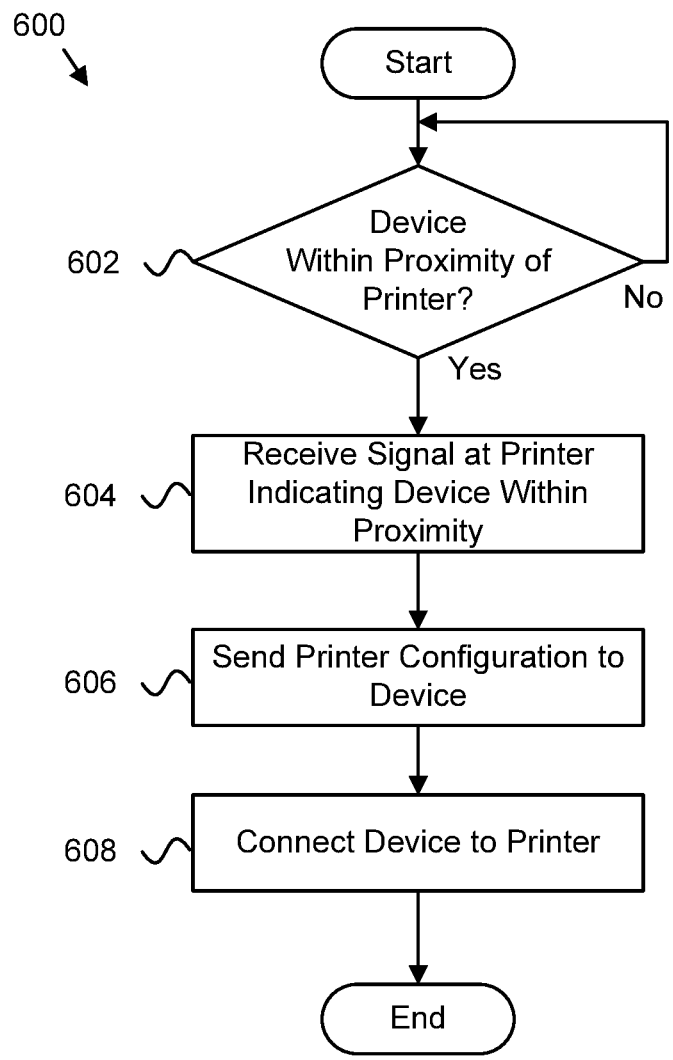
FIG. 6 is a schematic flow chart diagram illustrating one embodiment of another method for indicating a connection to a printer.

FIG. 6 is a schematic flow chart diagram illustrating one embodiment of a method 600 for indicating a connection to a printer 108. In one embodiment, the method 600 begins and determines 602 whether an information handling device 102 is within a communication proximity of a printer 108. In one embodiment, if the method 600 determines 602 that there is not an information handling device 102 within a communication proximity of the printer 108, the method 600 continues to listen, poll, check, or otherwise determine 602 an information handling device 102 is within a communication proximity of a printer 108.

In a further embodiment, if the method 600 determine 602 that an information handling device 102 is within a communication proximity of the printer 108, the printer 108 receives a signal 604 that an information handling device 102 is within a communication proximity. In various embodiments, the proximity module 304 determines whether an information handling device 102 is within a communication proximity of a printer 108 and sends a signal 604 to the printer 108 to indicate that the information handling device 102 is within a communication proximity. In certain embodiments, the signal is transmitted from a wireless beacon in communication with the information handling device 102 and the printer 108.

In one embodiment, the method 600 sends 606 configuration information to the information handling device 102 in response to determining the information handling device 102 is not configured to connect to the printer 108. In certain embodiments, the configuration module 306 sends the configuration information to the information handling device 102. The configuration information may comprise data, programs, scripts, or the like that allow the information handling device 102 to connect to the printer 108 and print on the printer 108. The method 600, in certain embodiments, connects 608 the information handling device 102 to the printer 108, and the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
receive a signal at one or more printers of a plurality of printers from an information handling device, the plurality of printers having existing connections to the information handling device, the signal requesting an indication from a printer of the plurality of printers that the printer is the selected printer to print to from the information handling device;
determine a type of indication to provide from the printer based on the received signal, the received signal specifying the type of indication for the printer to provide to indicate that it is the selected printer, the type of indication comprising a message presented on a display of the printer to indicate that the information handling device is connected to the printer, the message presented on the display of the printer comprising an identifier for the information handling device that is connected to the printer; and
provide an indication of the determined type from the printer that indicates the connection of the information handling device to the printer.

2. The apparatus of claim 1, wherein the type of indication comprises an audible sound generated by the printer to indicate that the information handling device is connected to the printer.

3. The apparatus of claim 1, wherein the type of indication comprises a blinking light generated by the printer to indicate that the information handling device is connected to the printer.

4. The apparatus of claim 1, further comprising code executable by the processor to receive a confirmation at the printer that the information handling device is connected to the printer.

5. The apparatus of claim 1, wherein the information handling device is communicatively coupled to one or more of the plurality of printers through a wireless network connection.

6. The apparatus of claim 5, wherein the wireless network connection comprises one or more of a Wi-Fi connection, a Bluetooth® connection, an NFC connection, and a connection through a wireless beacon.

7. A method comprising:
  receiving, by use of a processor, a signal at one or more printers of a plurality of printers from an information handling device, the plurality of printers having existing connections to the information handling device, the signal requesting an indication from a printer of the plurality of printers that the printer is the selected printer to print to from the information handling device;
  determining a type of indication to provide from the printer based on the received signal, the received signal specifying the type of indication for the printer to provide to indicate that it is the selected printer, the type of indication comprising a message presented on a display of the printer to indicate that the information handling device is connected to the printer, the message presented on the display of the printer comprising an identifier for the information handling device that is connected to the printer; and
  providing an indication of the determined type from the printer that indicates the connection of the information handling device to the printer.

8. The method of claim 7, wherein the type of indication comprises an audible sound generated by the printer to indicate that the information handling device is connected to the printer.

9. The method of claim 7, wherein the type of indication comprises a blinking light generated by the printer to indicate that the information handling device is connected to the printer.

10. The method of claim 7, further comprising receiving a confirmation at the printer that the information handling device is connected to the printer.

11. A program product comprising a computer readable storage medium that is not a transitory signal and that stores code executable by a processor, the executable code comprising code to perform:
  receiving a signal at one or more printers of a plurality of printers from an information handling device, the plurality of printers having existing connections to the information handling device, the signal requesting an indication from a printer of the plurality of printers that the printer is the selected printer to print to from the information handling device;
  determining a type of indication to provide from the printer based on the received signal, the received signal specifying the type of indication for the printer to provide to indicate that it is the selected printer, the type of indication comprising a message presented on a display of the printer to indicate that the information handling device is connected to the printer, the message presented on the display of the printer comprising an identifier for the information handling device that is connected to the printer; and
  providing an indication of the determined type from the printer that indicates the connection of the information handling device to the printer.

12. The program product of claim 11, wherein the type of indication comprises an audible sound generated by the printer to indicate that the information handling device is connected to the printer.

13. The program product of claim 11, wherein the type of indication comprises a blinking light generated by the printer to indicate that the information handling device is connected to the printer.

* * * * *